United States Patent Office 2,927,141
Patented Mar. 1, 1960

2,927,141

CATALYST FOR THE SELECTIVE HYDROGENATION OF ACETYLENE

Johann G. E. Cohn, West Orange, Alfred J. Haley, Jr., Hillside, and Hugh A. Shields, Kearny, N.J., assignors to Engelhard Industries, Inc., a corporation of New Jersey No Drawing. Application March 4, 1957
Serial No. 643,891

10 Claims. (Cl. 260—677)

This invention relates to a new catalyst useful for the selective hydrogenation of acetylene as well as to a method of selectively hydrogenating acetylene in admixture with other hydrocarbons. More particularly, the catalysts of the present invention contain palladium as the active catalyzing agent together with a promoter metal permitting highly selective hydrogenation of acetylene when present in certain ratios on a specific catalyst support.

Hydrocarbon gaseous mixtures containing acetylene as a contaminant, e.g. in amounts up to 2 percent by weight of acetylene, are difficult to selectively hydrogenate so as to obtain a mixture free of or containing not more than 10 parts per million of acetylene. One of the most suitable catalysts known for the selective hydrogenation of acetylene contained in a mixture of hydrocarbon gases is palladium supported on an activated alumina carrier. A particularly effective catalyst of this type consists of from about 0.001 percent to about 0.035 percent palladium based on the total weight of the supported catalyst. However, even this catalyst has its disadvantages in that selective hydrogenation is accompanied by the formation of polymeric materials on the catalyst which interfere with the activity of the catalyst and as a consequence, must be removed by oxidation at relatively high temperatures. When using such catalysts, one of the ways of avoiding rapid polymeric formation is to employ a catalyst containing a palladium content in the lower range of the 0.001 to 0.035 percent by weight content, e.g. below about 0.007 percent. Use of a lower palladium concentration has the further advantage that the palladium catalyst has a higher selectivity efficiency. However, upon eventual polymeric build-up and interference with the activity of the catalyst, it is found, upon regeneration, that the lower the palladium content of the catalyst, the more sensitive is the catalyst to the heat requirements of regeneration and hence, the less the useful life of the catalyst.

In accordance with the present invention, it has been found that certain metals, when used in certain critical ratios, are useful as promoters for the catalyst palladium in the selective hydrogenation of acetylene in hydrocarbon gaseous mixtures when palladium and the promoter metal are supported on a specific catalyst support. As a result, maximum selectivity of palladium results at higher proportions by weight of palladium than heretofore possible without increasing the relative rate of polymeric build-up. As a consequence of this discovery, catalyst regeneration can be accomplished without affecting the palladium content of the catalyst to the extent of interfering with its high selectivity.

More specifically, the present invention is based on the discovery that the metals of group I and group VIII of the periodic table, when used in certain proportions by weight, improve the selectivity of palladium as a catalyst in the hydrogenation of hydrocarbon mixtures containing acetylene in amounts up to 2 percent by weight providing the palladium and promoter metals are supported on activated alumina. The palladium content of the catalyst of the present invention ranges from about 0.001 percent to about 0.035 percent by weight of the total catalyst, preferably for the purposes of improved regeneration without loss of activity from about 0.007 percent to about 0.035 percent. The promoter metals, of which rhodium, ruthenium, gold, silver, copper and iron are particularly effective, should be present in amounts ranging from about 0.001 percent to 5 percent by weight of the catalyst.

The catalysts of the present invention are conveniently prepared by forming an aqueous solution of a salt of palladium and an aqueous solution of a salt of the promoter metal and contacting the carrier in the form of a dehydrated solid, e.g. anhydrous oxide of aluminum which is insoluble in water, with the solutions to permit the salts to form a firm and adherent deposit of oxide or hydroxide on the surface of the carrier. The resulting material is subsequently reduced to obtain the active catalyst. Reference may be had to U.S. Patent No. 2,475,155 of July 5, 1949, for the description of a particularly advantageous method of depositing palladium on the surface of a catalyst support such as activated alumina. If desired, a combined solution of salts of palladium and the promoter metal may be used in place of separate solutions.

In accordance with certain preferred embodiments of the present invention, certain of the promoter metals are found to be particularly efficient in aiding in the catalytic hydrogenation of certain gaseous hydrocarbon mixtures. This is in conformity with general experience in the field of catalytic hydrogenation in that it is well recognized that a particular gaseous hydrocarbon mixture necessitates a specific catalyst in order to obtain optimum results. Stated differently, a catalyst of unusually high selectivity for the hydrogenation of a given hydrocarbon mixture may not be as effective as another catalyst of slightly different proportions by weight or differing composition for catalyzing the hydrogenation of another given hydrocarbon mixture.

In general, it may be stated that the acetylene content of a hydrocarbon mixture containing up to about 2 percent by weight of acetylene together with a balance consisting substantially of ethylene and ethane is most effectively hydrogenated in accordance with the present invention when the catalyst consists of palladium and rhodium supported on the activated alumina carrier. A highly effective catalyst contains about 0.01 percent by weight of palladium and about 0.01 percent by weight of rhodium. Hydrocarbon mixtures consisting essentially of up to 2 percent by weight of acetylene and a balance consisting substantially of ethylene and ethane are commonly referred to as "commercial ethylene." Typical analyses of commercial ethylene are as follows:

| A | Percent |
|---|---|
| $C_2H_2$ | 0.005–2 |
| $C_2H_4$ | 90–99.9 |
| $C_2H_6$, $CH_4$ | 0.1–4 |

| B | Percent |
|---|---|
| $C_2H_2$ | 0.005–2 |
| $C_2H_4$ | 20–80 |
| $C_2H_6$ | balance |

In the event the gaseous hydrocarbon mixture consists essentially of up to about 2 percent by weight of acetylene and a mixture of hydrocarbons including hydrocarbons of higher molecular weight than ethane, for example, a mixture of the following compositions:

| C | Percent |
|---|---|
| $C_2H_2$ | 0.05–1 |
| $C_2H_4$ | 15–35 |
| $C_3H_6$ | 5–15 |
| $H_2$ | 10–35 |
| $CH_4$, $C_2H_6$, $C_3H_8$, $C_4H_{10}$ | balance | a preferred catalyst has been found, in accordance with the present invention, to be one consisting essentially of palladium and silver supported on activated alumina. For this type of mixture, a highly effective catalyst contains about 0.01 percent palladium and 0.01 percent silver based on the weight of the catalyst.

In accordance with the process of the present invention selective hydrogenation of hydrocarbon mixtures containing up to about 2 percent of acetylene is accomplished by passing the gaseous mixture together with hydrogen in a quantity at least stoichiometrically equivalent to the acetylene content of the gaseous mixture over the catalyst of the present invention at elevated temperatures and pressure conditions. Although temperature and pressure conditions are not the essence of the present invention since the process of selectively hydrogenating acetylene in gaseous mixtures using other catalysts is known, preferred conditions include a temperature within the range from about 85 to 165° C. and a pressure of from about 250 to 450 p.s.i.g. Space velocities of from about 3,000 to 7,000 volumes of gaseous mixture at normal pressure and temperature conditions per volume of catalyst per hour are found to be suitable to obtain an effluent containing not more than 10 p.p.m. of acetylene. Regeneration of the catalyst upon accumulation of polymeric deposit may be accomplished by heating the catalyst in air at a temperature of, for example, 500° C. without substantial effect on the selectivity of the catalyst.

The following specific examples are for the purpose of illustrating the present invention:

*Example I*

Commercial ethylene (99 percent ethylene and 0.25 percent acetylene by weight) with an addition of about 0.7 percent by weight of hydrogen was passed over a 0.01 percent palladium and 0.01 percent rhodium-containing catalyst supported on cylindrical ⅛″ activated alumina pellets at a temperature of 100–140° C. under 350 p.s.i.g. and a space velocity of 5000 volumes of gas mixture (N.T.P.) per volume of catalyst per hour. The effluent contained from 1 to 10 p.p.m. $C_2H_2$ and essentially no $H_2$ after 200 hours. The catalyst was then regenerated by heating with air at 500° C. Another gaseous mixture of the same composition was passed over the regenerated catalyst for 800 hours, the effluent containing below 10 p.p.m. $C_2H_2$.

*Example II*

A gaseous mixture containing 33 mol percent ethane, 66 mol percent ethylene, 0.35 mol percent acetylene, and 1.1 mol percent $H_2$ was passed over a 0.01 percent palladium +0.01 percent rhodium-containing catalyst supported on ⅛″ activated alumina pellets, which had been previously heated to 500° C. in air at a temperature of 110° C., a pressure of 350 p.s.i.g. and a space velocity of 5000 volumes gas mixture (N.T.P.) per volume of catalyst per hour. After 157 hours operation, the effluent still contained less than 5 p.p.m. $C_2H_2$.

*Example III*

A gaseous mixture containing 34 percent $H_2$, 33 percent ethylene, 33 percent ethane, 0.5 percent acetylene by weight and traces of paraffinic compounds was passed at 90 liters per hour (N.T.P.) over 20 grams of 0.005 percent palladium and 1 percent silver-containing catalyst supported on ⅛″ activated alumina pellets at a temperature of 130–150° C. and a pressure of 35 p.s.i.g. The effluent contained 31.8–33 percent $H_2$. No acetylene was detected in the effluent gas.

*Example IV*

A gaseous mixture containing, by volume, 15 percent hydrogen, 40 percent ethylene, 37 percent ethane, 8 percent propylene and 0.5 percent acetylene was passed, at the rate of 75 liters per hour, over 15 grams of a catalyst consisting of 0.01 percent palladium and 0.01 percent copper deposited on ⅛″ activated alumina pellets. (The catalyst had previously been oxidized by heating in air at a temperature of 400° C. for 17 hours.) Using an operating pressure of 150 p.s.i.g. and a catalyst temperature of 115° C., the effluent gas contained 12.1 percent hydrogen by volume, and 3–31 p.p.m. of acetylene. At a temperature of 112° C., the effluent contained 13.4 percent hydrogen, by volume, and less than 73 p.p.m. of acetylene.

*Example V*

A gaseous mixture having the same composition as that used in Example IV was passed over a catalyst consisting of 0.1 percent palladium and 0.1 percent gold on ⅛″ activated alumina pellets at a pressure of 150 p.s.i.g. At a temperature below about 90° C. and using the same space velocity as in Example IV, the catalyst was very selective, the effluent gas containing 13.6 to 14.3 percent hydrogen, by volume, and less than 32–46 p.p.m. of acetylene.

*Example VI*

A gaseous mixture containing, by volume, 15 percent hydrogen, 26 percent ethylene, 14 percent propylene and 0.5 percent acetylene was passed over a catalyst consisting of 0.01 percent palladium and 1.0 percent silver on ⅛″ activated alumina pellets. The operating temperature was 180° C. and the space velocity used was 5,000 volumes of gas per catalyst volume per hour. The acetylene in the effluent gas was reduced to less than 10 p.p.m., and only a small amount of hydrogen was lost, after an initial catalyst seasoning period, which means that little ethylene was hydrogenated and the catalyst possessed good selectivity.

When the catalyst is spent, it can be regenerated by treatment with a mixture of air and steam for a period of about 2 to 6 hours at a temperature of about 400 to 500° C., after which effective acetylene removal from the gas stream can be resumed.

It will be obvious to those skilled in the art that many modifications may be made within the scope of the present invention without departing from the spirit thereof, and the invention includes all such modifications.

What is claimed is:

1. A catalyst for the selective hydrogenation of acetylene consisting essentially of palladium, a promoter selected from the group consisting of rhodium, silver, and iron, and a support, activated alumina, palladium being present in the range 0.001 to 0.035 percent by weight of the catalyst and the promoter metal being present in the range 0.001 to 5 percent by weight of the catalyst.

2. A catalyst for the selective hydrogenation of acetylene consisting essentially of palladium, rhodium and as a support, activated alumina, palladium being present in the range 0.001 to 0.035 percent by weight of the catalyst and rhodium being present in the range 0.001 to 5 percent by weight of the catalyst.

3. A catalyst for the selective hydrogenation of acetylene consisting essentially of palladium, silver and as a support, activated alumina, palladium being present in the range 0.001 to 0.035 percent by weight of the catalyst and silver being present in the range 0.001 to 5 percent by weight of the catalyst.

4. A catalyst for the selective hydrogenation of acetylene consisting essentially of palladium, rhodium and as a support, activated alumina, there being about 0.01 percent palladium and 0.01 percent rhodium based on the weight of the catalyst.

5. A catalyst for the selective hydrogenation of acetylene consisting essentially of palladium, silver and as a support, activated alumina, there being about 0.01 percent palladium and 0.01 percent silver based on the weight of the catalyst.

6. A process for selectively hydrogenating acetylene in a gaseous mixture containing acetylene in amounts up to about 2 percent by weight which comprises the steps of passing the gaseous mixture together with hydrogen in a quantity at least stoichiometrically equivalent to the acetylene content of the gaseous mixture over a catalyst at elevated temperature and pressure conditions, the catalyst consisting essentially of palladium, a promoter metal selected from the group consisting of rhodium, silver, and iron, and as a support, activated alumina, palladium being present in the range 0.001 to 0.035 percent by weight of the catalyst and promoter metal being present in the range 0.001 to 5 percent by weight of the catalyst.

7. A process for selectively hydrogenating acetylene in a gaseous mixture of hydrocarbons consisting essentially of up to 2 percent by weight of acetylene, ethylene and ethane which comprises the steps of passing the gaseous mixture together with hydrogen in a quantity at least stoichiometrically equivalent to the acetylene content of the gaseous mixture over a catalyst at elevated temperature and pressure conditions, the catalyst consisting essentially of palladium, rhodium and, as a support, activated alumina, palladium being present in the range 0.001 to 0.035 percent by weight of the catalyst and rhodium being present in the range 0.001 to 5 percent by weight of the catalyst.

8. A process for selectively hydrogenating acetylene in a gaseous mixture of hydrocarbons consisting essentially of up to 2 percent by weight of acetylene, ethylene and ethane which comprises the steps of passing the gaseous mixture together with hydrogen in a quantity at least stoichiometrically equivalent to the acetylene content of the gaseous mixture over a catalyst at elevated temperature and pressure conditions, the catalyst consisting essentially of palladium, rhodium and, as a support, activated alumina, there being about 0.01 percent palladium and 0.01 percent rhodium based on the weight of the catalyst.

9. A process for selectively hydrogenating acetylene in a gaseous mixture of hydrocarbons consisting essentially of up to 2 percent by weight of acetylene and a mixture of hydrocarbons including hydrocarbons of higher molecular weight than ethane which comprises the steps of passing the gaseous mixture together with hydrogen in a quantity at least stoichiometrically equivalent to the acetylene content of the gaseous mixture over a catalyst at elevated temperature and pressure conditions, the catalyst consisting essentially of palladium, silver and, as a support, activated alumina, palladium being present in the range 0.001 to 0.035 percent by weight of the catalyst and silver being present in the range 0.001 to 5 percent by weight of the catalyst.

10. A process for selectively hydrogenating acetylene in a gaseous mixture of hydrocarbons consisting essentially of up to 2 percent by weight of acetylene and a mixture of hydrocarbons including hydrocarbons of higher molecular weight than ethane which comprises the steps of passing the gaseous mixture together with hydrogen in a quantity at least stoichiometrically equivalent to the acetylene content of the gaseous mixture over a catalyst at elevated temperature and pressure conditions, the catalyst consisting essentially of palladium, silver and, as a support, activated alumina, there being about 0.01 percent palladium and 0.01 percent silver based on the weight of the catalyst.

References Cited in the file of this patent

UNITED STATES PATENTS

| | | |
|---|---|---|
| 2,475,155 | Rosenblatt | July 5, 1949 |
| 2,802,889 | Frevel et al. | Aug. 13, 1957 |